United States Patent
Alkov et al.

(10) Patent No.: US 9,230,009 B2
(45) Date of Patent: Jan. 5, 2016

(54) ROUTING OF QUESTIONS TO APPROPRIATELY TRAINED QUESTION AND ANSWER SYSTEM PIPELINES USING CLUSTERING

(71) Applicant: International Business Machines Corporation, Armonk, NY (US)

(72) Inventors: Christopher S. Alkov, Austin, TX (US); Suzanne L. Estrada, Boca Raton, FL (US); Peter F. Haggar, Raleigh, NC (US); Kevin B. Haverlock, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/909,142

(22) Filed: Jun. 4, 2013

(65) Prior Publication Data
US 2014/0358922 A1 Dec. 4, 2014

(51) Int. Cl.
G06F 17/30 (2006.01)
G06N 5/04 (2006.01)

(52) U.S. Cl.
CPC .......... *G06F 17/30598* (2013.01); *G06N 5/041* (2013.01); *G06N 5/043* (2013.01)

(58) Field of Classification Search
CPC ................. G06F 17/30598; G06F 17/30601
USPC ........................................ 707/737, 738, 740
See application file for complete search history.

(56) References Cited

U.S. PATENT DOCUMENTS

| | | |
|---|---|---|
| 5,960,422 A | 9/1999 | Prasad |
| 6,424,971 B1 | 7/2002 | Kreulen et al. |
| 6,523,036 B1 | 2/2003 | Hickman et al. |
| 6,591,405 B1 * | 7/2003 | Doddi ........................ 716/105 |
| 6,804,670 B2 | 10/2004 | Kreulen et al. |
| 6,904,428 B2 | 6/2005 | Frieder et al. |
| 6,993,517 B2 | 1/2006 | Naito et al. |
| 7,349,899 B2 | 3/2008 | Namba |
| 7,398,270 B1 | 7/2008 | Choi et al. |

(Continued)

FOREIGN PATENT DOCUMENTS

EP  2 328 135 A1  6/2011

OTHER PUBLICATIONS

Lita, Instance-Based Question Answering, Dec. 2006, 231pages.*

(Continued)

*Primary Examiner* — Noosha Arjomandi
(74) *Attorney, Agent, or Firm* — Stephen R. TKacs; Stephen J. Walder, Jr.; Jeffrey S. LaBaw

(57) ABSTRACT

Mechanisms for selecting a pipeline of a question and answer (QA) system to process an input question are provided. An input question is received and analyzed to identify at least one feature of the input question. Clustering of the input question, with one or more previously generated clusters of questions, is performed based on the at least one feature of the input question. Based on results of the clustering, a matching cluster, of the one or more previously generated clusters, is identified with which the input question is associated. A QA system pipeline associated with the matching cluster is identified and the input question is processed using the identified QA system pipeline to generate one or more candidate answers for the input question. Each cluster in the one or more previously generated clusters has an associated QA system pipeline.

20 Claims, 10 Drawing Sheets

(56) References Cited

U.S. PATENT DOCUMENTS

| | | | |
|---|---|---|---|
| 7,636,730 | B2 | 12/2009 | Sanfilippo et al. |
| 7,720,870 | B2 | 5/2010 | Barbosa et al. |
| 7,809,660 | B2 | 10/2010 | Friedlander et al. |
| 7,840,556 | B1* | 11/2010 | Dayal et al. .................... 707/721 |
| 8,108,392 | B2 | 1/2012 | Marvit et al. |
| 8,200,672 | B2 | 6/2012 | Adachi et al. |
| 8,275,803 | B2 | 9/2012 | Brown et al. |
| 8,510,236 | B1 | 8/2013 | Kumar et al. |
| 2004/0267607 | A1 | 12/2004 | Maddux |
| 2005/0055193 | A1* | 3/2005 | Bondarenko ................. 703/22 |
| 2005/0143999 | A1 | 6/2005 | Ichimura |
| 2005/0188126 | A1* | 8/2005 | Mashima et al. .............. 710/36 |
| 2006/0029184 | A1* | 2/2006 | Lin et al. ..................... 378/73 |
| 2006/0277165 | A1 | 12/2006 | Yoshimura et al. |
| 2007/0192308 | A1 | 8/2007 | Wei et al. |
| 2008/0077570 | A1* | 3/2008 | Tang et al. ................... 707/5 |
| 2009/0112828 | A1 | 4/2009 | Rozenblatt |
| 2009/0287678 | A1 | 11/2009 | Brown et al. |
| 2009/0292687 | A1 | 11/2009 | Fan et al. |
| 2009/0327279 | A1 | 12/2009 | Adachi et al. |
| 2010/0030769 | A1 | 2/2010 | Cao et al. |
| 2010/0076978 | A1 | 3/2010 | Cong et al. |
| 2010/0106723 | A1* | 4/2010 | Lee .............................. 707/737 |
| 2011/0066587 | A1 | 3/2011 | Ferrucci et al. |
| 2011/0103353 | A1* | 5/2011 | Boda et al. ................... 370/338 |
| 2011/0125734 | A1 | 5/2011 | Duboue et al. |
| 2011/0173199 | A1* | 7/2011 | Heisig et al. ................. 707/737 |
| 2011/0218947 | A1 | 9/2011 | Vadlamani et al. |
| 2011/0219002 | A1* | 9/2011 | Bartram et al. .............. 707/738 |
| 2011/0246465 | A1* | 10/2011 | Koister et al. ................ 707/737 |
| 2012/0030157 | A1* | 2/2012 | Tsuchida et al. .............. 706/20 |
| 2012/0301864 | A1 | 11/2012 | Bagchi et al. |
| 2013/0007055 | A1 | 1/2013 | Brown et al. |
| 2013/0018652 | A1 | 1/2013 | Ferrucci et al. |
| 2013/0018876 | A1 | 1/2013 | Chu-Carroll et al. |
| 2013/0024457 | A1 | 1/2013 | Chua et al. |
| 2013/0066886 | A1 | 3/2013 | Bagchi et al. |
| 2013/0159272 | A1* | 6/2013 | Donmez et al. .............. 707/706 |
| 2013/0262500 | A1* | 10/2013 | Bratspiess et al. ............ 707/769 |
| 2014/0075334 | A1* | 3/2014 | Dror et al. ................... 715/753 |
| 2014/0161416 | A1 | 6/2014 | Chou et al. |
| 2014/0172883 | A1* | 6/2014 | Clark et al. .................. 707/749 |
| 2014/0358631 | A1* | 12/2014 | Ghose et al. ................. 705/7.29 |

OTHER PUBLICATIONS

U.S. Appl. No. 13/943,067, 1 page.
U.S. Appl. No. 14/102,671; 1 page.
U.S. Appl. No. 13/909,269, 1 page.
"Word Clustering", http://www.ilc.cnr.it/EAGLES96/rep2/node37.html, 5 pages, accessed on Apr. 4, 2013.
Dhillon, Inderjit S., "Co-clustering documents and words using Bipartite Spectral Graph Partitioning", Proceedings of the Seventh ACM SIGKDD International Conference on Knowledge Discovery and Data Mining (KDD '01), www.cs.utexas.edu/~inderjit/public_papers/kdd_bipartite.pdf, 2001, 6 pages.
High, Rob, "The Era of Cognitive Systems: An Inside Look at IBM Watson and How it Works", IBM Corporation, Redbooks, 2012, 16 pages.
Stewart, Brandon M., "Practical Skills for Document Clustering in R*", Handout prepared for the Tools for Text Workshop at the University of Washington, faculty.washington.edu/wilker/tft/Stewart.LabHandout.pdf, Jun. 15, 2010, pp. 1-10.
Yuan, Michael J., "Watson and healthcare", IBM developerWorks, IBM Corporation, Apr. 12, 2011, 14 pages.

* cited by examiner

ROUTING OF QUESTIONS TO APPROPRIATELY TRAINED QUESTION AND ANSWER SYSTEM PIPELINES USING CLUSTERING

BACKGROUND

The present application relates generally to an improved data processing apparatus and method and more specifically to mechanisms for routing questions to appropriately trained question and answer system pipelines using clustering of the questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for selecting a pipeline of a question and answer (QA) system to process an input question are provided. The method comprises receiving, in the data processing system, an input question and analyzing, by the data processing system, the input question to identify at least one feature of the input question. The method further comprises performing, by the data processing system, clustering of the input question with one or more previously generated clusters of questions based on the at least one feature of the input question. In addition, the method comprises identifying, by the data processing system, based on results of the clustering, a matching cluster, of the one or more previously generated clusters, with which the input question is associated. Furthermore, the method comprises identifying, by the data processing system, a QA system pipeline associated with the matching cluster. The method also comprises processing, by the data processing system, the input question using the identified QA system pipeline to generate one or more candidate answers for the input question, wherein each cluster in the one or more previously generated clusters has an associated QA system pipeline.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
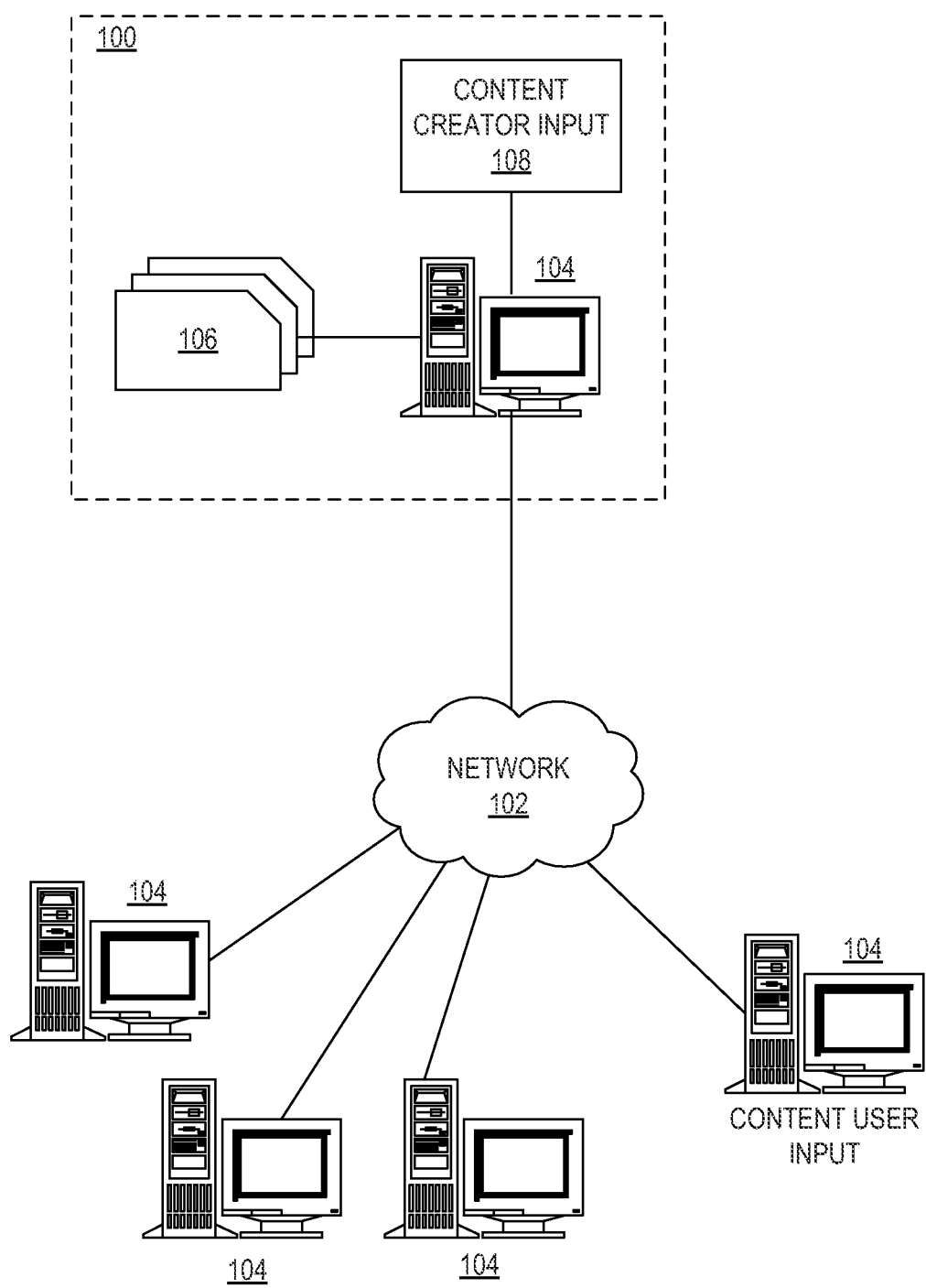
FIG. 1 depicts a schematic diagram of one illustrative embodiment of a question/answer (QA) system in a computer network.

The illustrative embodiments provide mechanisms for improving the training and operation of a Question and Answer (QA) system based on clustering of questions according to their extracted features/attributes. That is, when a QA system, such as the Watson™ system mentioned above, is configured, it is subjected to a training operation that consists of one or more runs of one or more sets of training questions. The operation and results generated by the QA system are monitored and the configuration of the QA system is modified to improve the results generated by the QA system, e.g., data, algorithms, and/or configuration settings are modified such that the QA system answers a high percentage of the training questions accurately, where the requisite percentage of training questions accurately may be specified by one or more threshold values. Once the training is done to a desired level of satisfaction, the QA system is ready to be tested with a different set of questions, i.e. a testing set of questions.

It should be appreciated that currently, training and test questions are taken from the same large group of questions and are selected arbitrarily, and sometimes subjectively based on a human analyst's interpretation of the questions. Thus, there may be an overlap in the questions sets used for training and testing. This causes an issue in that often it is desirable to ensure that the testing set of questions is a separate and distinct set of questions from that of the training set of questions to ensure that the QA system is being tested appropriately, i.e. ensuring that the QA system is being tested with a computationally different set of questions than the set of questions with which the QA system was trained.

In addition, often times it is desirable for a QA system to be configured to operate on a wide number of domains, e.g., subject matter categories. For example, a QA system may operate on questions concerning the healthcare domain, an aerospace domain, a financial industry domain, or any of a plethora of other domains. Without specialized training in each of these domains, the results generated by the QA system may be less than desirable. One solution to such a dilemma is to configure the QA system with multiple pipelines, each pipeline configured and optimized for a specific domain. Thus, in the example above, the QA system may have a pipeline optimized for the healthcare domain, a second pipeline optimized for the aerospace domain, a third pipeline optimized for the financial industry domain, and so on. A problem arises, however, with regard to the routing of a question to a correct pipeline in the QA system that is most likely to provide the best answer results.

The illustrative embodiments provide mechanisms for improving the training and runtime operation of QA systems through the clustering of questions in accordance with the features/attributes extracted from the questions. In one aspect of the illustrative embodiments, as part of a question analysis phase, the question analyzed to identify various features/attributes of the question, e.g., focus, lexical answer type (LAT), question classification (QClass), and question sections (QSections). These extracted features/attributes are used as input to a clustering engine which clusters questions according to similar features/attributes. Based on the generated clusters, the centers of the clusters are determined and subsequently submitted questions may be similarly clustered, such as by measuring the Euclidean dimensional distance of the subsequent questions from cluster centers. Depending on the training/testing objective, the subsequently submitted questions can be either accepted or rejected based on the clustering of the subsequently submitted questions with regard to the defined clusters. For example, during training, the subsequently submitted questions may be accepted as being part of the closest cluster to thereby add to the definition of that cluster. During testing, a subsequently submitted question may be rejected as being too computationally similar to training questions if the question's distance from a closest cluster center is smaller than a predetermined threshold or may be accepted if the question's distance from a closest cluster center is equal to or greater than the predetermined threshold. Alternatively, the testing question may be accepted if the objective is to identify testing questions that have a high likelihood of being answered correctly by the trained QA system since the closeness of the testing question to a defined cluster indicates that the QA system has been trained to answer significantly similar questions.

In addition, in another aspect of the illustrative embodiments, the QA system may comprise a plurality of pipelines trained according to separate domains. Such training may be done using the clustering of questions noted above or in another manner. That is, during training, the QA system is trained with a set of training questions that are clustered according to the extracted features/attributes of the questions. Each cluster may be associated with a different domain and may have its own associated pipeline in the QA system. Thus, each cluster represents the questions intended for a particular pipeline.

When a new question is received, it is clustered according to the similarly of extracted features/attributes of the new question with the features/attributes of the training questions that generated the various clusters. Through this clustering, one can determine the closest cluster for the new question and the corresponding pipeline. The new question may then be submitted to the pipeline corresponding to the closest cluster. If the question is deemed to overlap question clusters between pipelines, then the new question may be submitted to multiple pipelines in approximately a parallel manner. The user may then be presented with multiple answers from multiple pipelines and may provide feedback as to which answer and supporting passage the user feels is the best answer for the question. The question is then associated with the cluster of questions from the specific pipeline that provided the best answer. As a result, over time, the QA system becomes more accurate as the clusters are augmented with information about additional questions clustered in the manner described above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to clustering questions based on identified attributes of the questions for purposes of training the QA system and/or identifying a confidence that a subsequently submitted question is likely to be answered correctly based on how well the question matches a previously defined question cluster generated during training.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, subsystems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
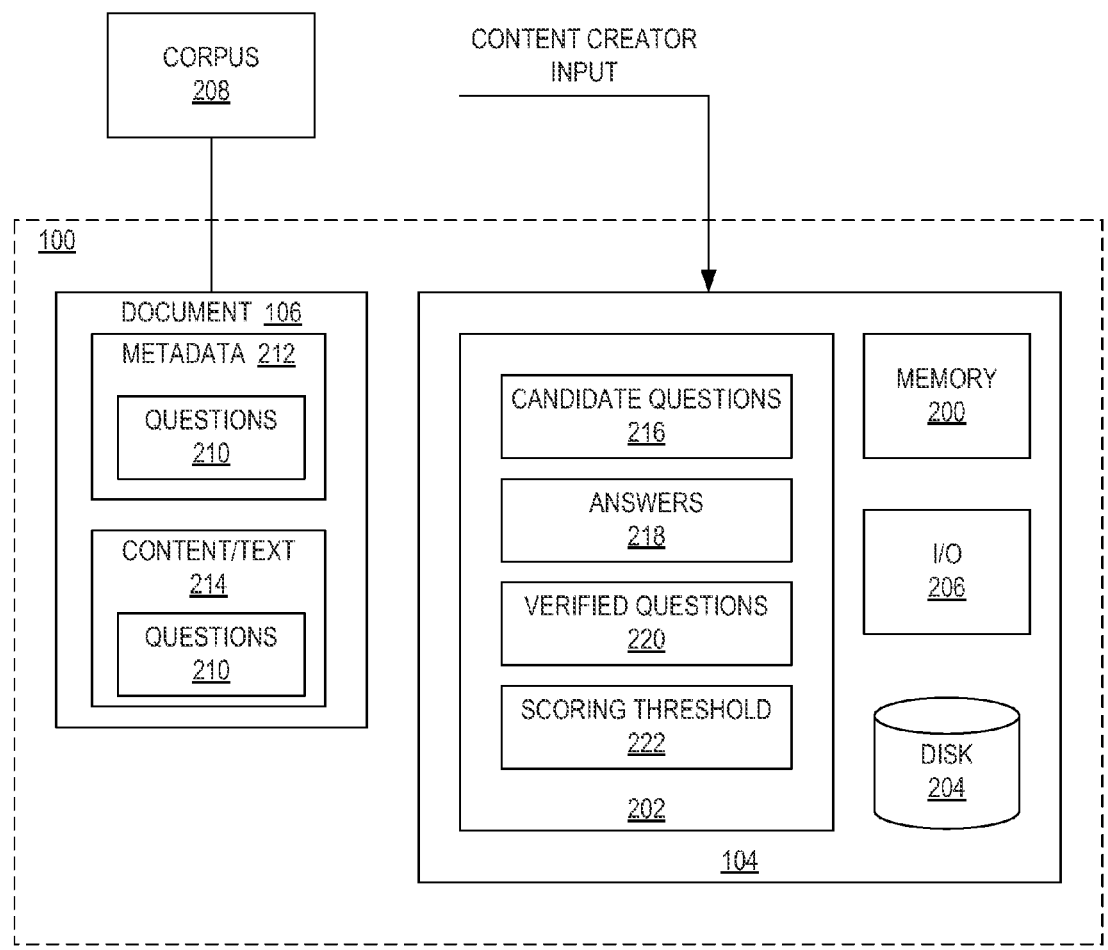
FIG. 2 depicts a schematic diagram of one embodiment of the QA system of FIG. 1.
Figure 4:
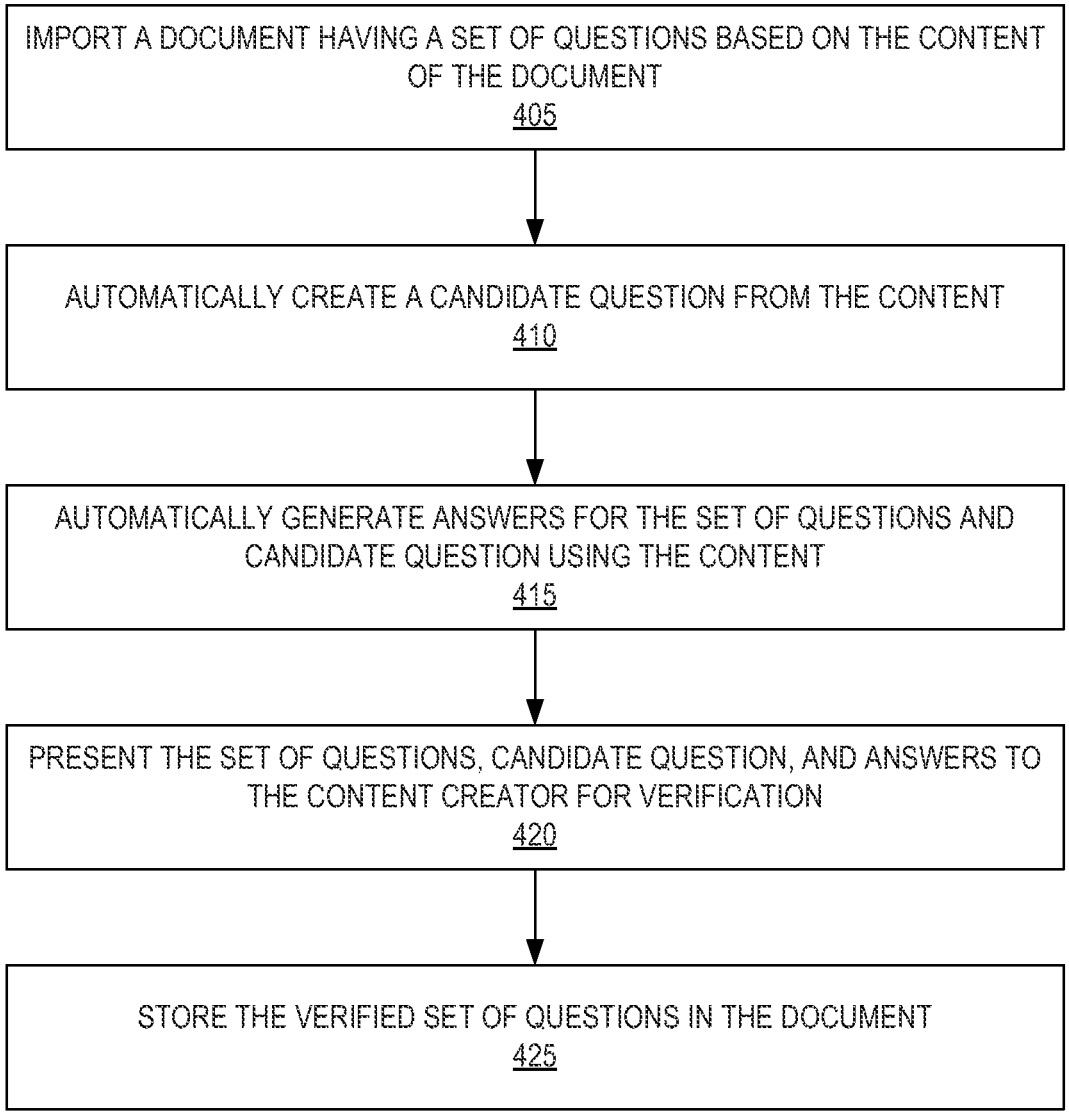
FIG. 4 depicts a flowchart diagram of one embodiment of a method for question/answer creation for a document.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to the illustrative embodiments describes in conjunction with the subsequent figures.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
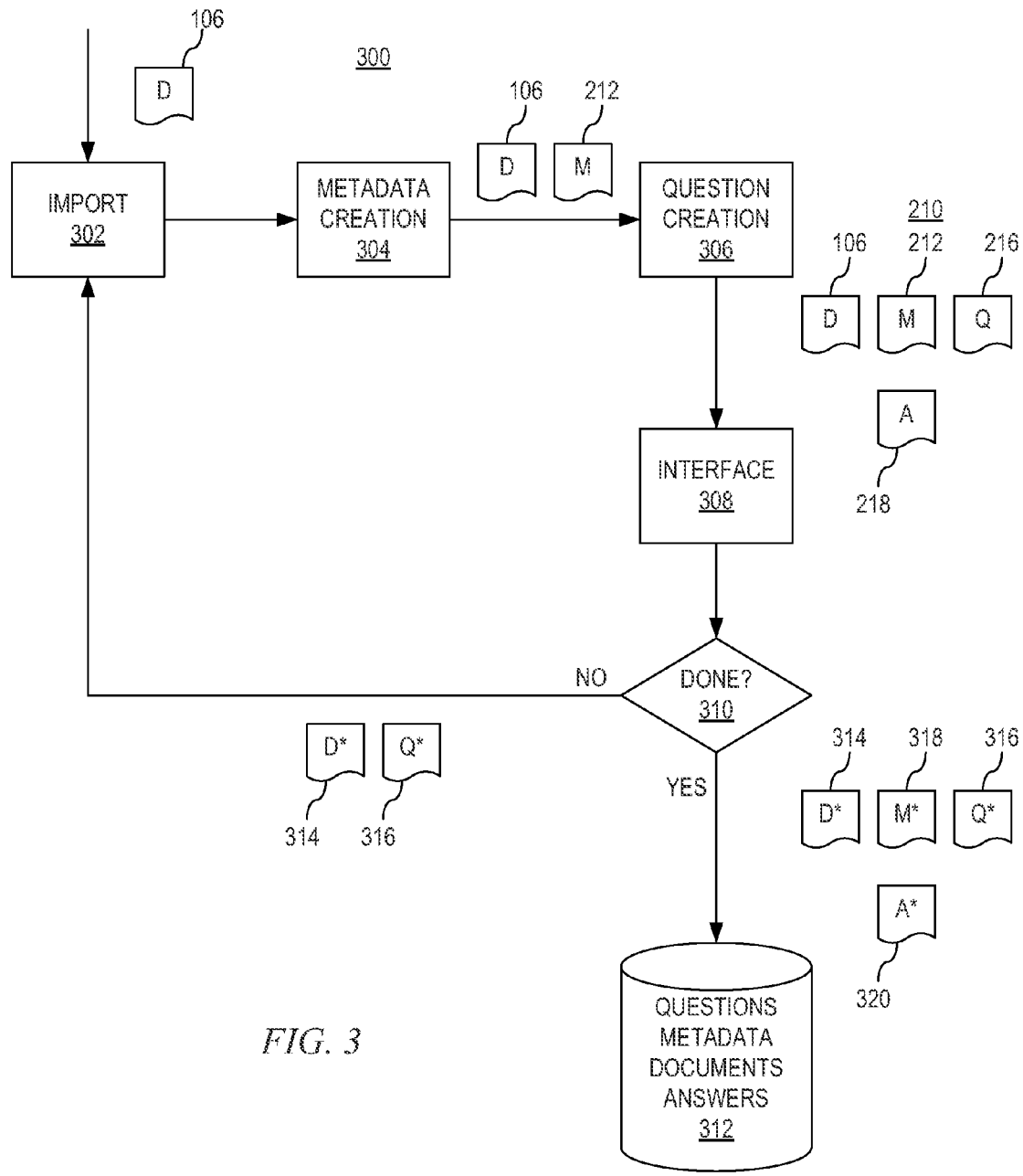
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

The above description illustrates the manner by which content creators may generate metadata for use by a QA system 100 when performing answer generation for input questions. As discussed above, the QA system 100 also is used to answer input questions submitted by users via one or more client computing devices. For example, in a healthcare domain, the QA system 100 may be utilized to receive questions directed to medical issues, such as diagnosis, treatment, and the like. The QA system 100 may process such input questions through a QA system analysis pipeline to evaluate the input question against a corpus of data/information, which may include documents or content having associated metadata as previously described above, unstructured documents, or the like, and generate one or more potential answers to the input question.

Figure 5:
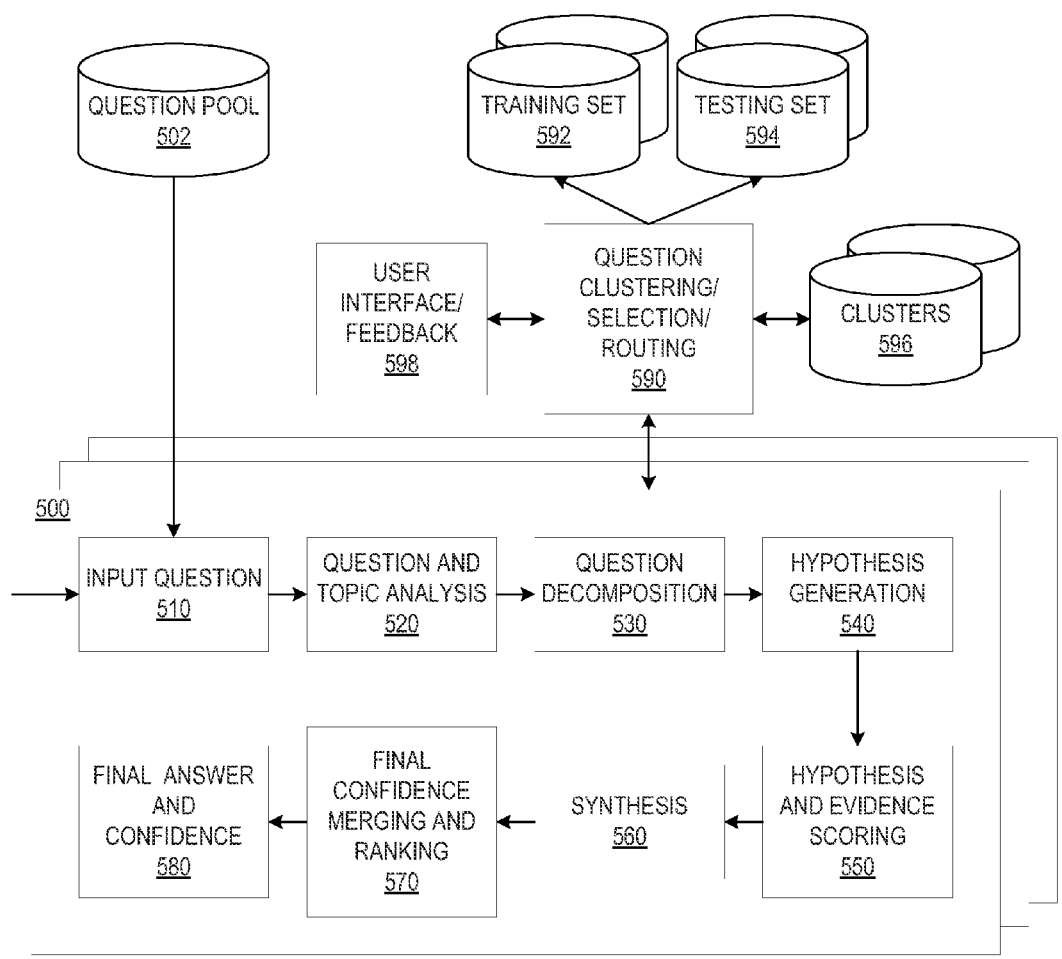
FIG. 5 is an example block diagram of a question and answer system analysis pipeline in accordance with one illustrative embodiment.

FIG. 5 illustrates a QA system pipeline for processing an input question in accordance with one illustrative embodiment. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. The input question may be obtained from a question pool 502 that may be established for training and/or testing of the QA system pipeline 500, from a user via a client computing device (not shown) during runtime operation, or the like. That is, a user may input, via a user interface of the client computing device, an input question for which the user wishes to obtain an answer, e.g., "Who are Putin's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic. As mentioned above, similar questions may be submitted via a pre-established question pool 502 which may be used for training and/or testing purposes.

The identified major features may then be used during the question decomposition stage 530 to decompose the question into one or more queries that may be applied to the corpus of data/information in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information. The queries being applied to the corpus of data/information generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

As shown in FIG. 5, in accordance the illustrative embodiments, question clustering, selection, and/or routing 590 may be performed based on the particular training, testing, or runtime objectives of the QA system. For example, the clustering may be done during training and/or testing of the QA system pipeline 500 to generate training question set 592 and/or testing question set 594, as well as clusters 596 which may be used to cluster questions into various clusters of the training question set 592 and/or testing question set 594. The clustering may be used to select which questions are maintained and which are discarded during testing based on the closeness of the question to training question set clusters.

Furthermore, during runtime, the clustering may be used to route question processing to a QA system pipeline 500 configured for the particular cluster to which an input question is clustered. That is, as illustrated in FIG. 5, there may be multiple pipelines 500 configured for the QA system, each pipeline configured to perform question analysis and answering for a particular domain. The clustering 590 may be used to identify which pipeline is best suited for providing answers to a particular question based on the clustering 590 analysis of the question's features/attributes.

In accordance with one illustrative embodiment, during a training operation for the QA system, a subset of the question pool 502 may be input to a QA system pipeline 500 to train the QA system pipeline 500 for answering questions. This subset of the question pool 502 is referred to as the training question set and is stored as the training set 592 by the clustering mechanisms 590 with each question having an associated identifier of the cluster(s) in the cluster set 596 to which it is associated. The training question set may be selected arbitrarily, based on human analyst subjective interpretations of the questions in the question pool 502, or the like. In some illustrative embodiments, the training question set may be selected based on one or more domains to which the questions are directed, such that separate training question sets may be used for training different ones of QA system pipelines 500 of the QA system for use with different domains.

The input question 510 is analyzed in accordance with phase 520 of the pipeline 500 described above to extract features/attributes of the input question 510. For example, through the analysis performed in phase 520, various features including the focus, lexical answer type (LAT), the question classification (QClass), and question sections (QSection) features may be extracted and analyzed. The focus of a question is the portion of the question that references the answer, e.g., the word "he" in the question "was he the greatest football player?" is the focus of the question indicating that a male person is the focus of the question. The LAT refers to the terms in the question that indicates what type of entity is being asked for, e.g., in the statement "he liked to write poems" the LAT is "poets". The QClass is the type the question belongs to, e.g., name, definition, category, abbreviation, number, date, etc., e.g., if the question is "who was the first President of the United States?," the QClass is a name since the question is looking for a name as the answer. The QSection refers to question fragments that require special processing and inform lexical restraints on the answer, e.g., "this 7 letter word . . . " provides a lexical restraint on the answer being a 7 letter word.

The extracted features/attributes may be used as input to a clustering algorithm that associates the input question 510 with a particular cluster within a plurality of clusters, where each cluster represents a grouping of questions having similar features/attributes. Various clustering algorithms may be employed to perform the clustering of the questions based on the extracted features/attributes. Examples of clustering algorithms that may be employed for this purpose include the clustering algorithms described in Dhillon, "Co-Clustering Documents and Words Using Bipartite Spectral Graph Partitioning," University of Texas, Austin, KDD 2001 San Francisco, Calif., 2001 and "Word Clustering," EAGLES Preliminary Recommendations on Semantic Encoding Interim Report, May 1998. Moreover, a number of U.S. patents and patent application Publications describe lexical clustering mechanisms that may be employed to perform clustering of the questions of the illustrative embodiments including:

U.S. Pat. No. 6,804,670 entitled "Method for Automatically Finding Frequently Asked Questions in a Helpdesk Data Set";

U.S. Pat. No. 6,424,971 entitled "System and Method for Interactive Classification and Analysis of Data";

U.S. Pat. No. 8,108,392 entitled "Identifying Clusters of Words According to Word Affinities";

U.S. Pat. No. 7,720,870 entitled "Method and System for Quantifying the Quality of Search Results Based on Cohesion"

U.S. Pat. No. 7,636,730 entitled "Document Clustering Methods, Document Cluster Label Disambiguation Methods, Document Clustering Apparatus, and Articles of Manufacture"; and U.S. Patent Application Publication No. 2009/0327279 entitled "Apparatus and Method for Supporting Document Data Search."

These are but examples of techniques used for clustering lexical content based on features/attributes of the lexical content. Other techniques for clustering words, groups of words, or the like, may be applied to the questions and extracted features/attributes of the questions in the illustrative embodiments, without departing from the spirit and scope of the illustrative embodiments. For example, various techniques based on classifying the features/attributes, quantifying features/attributes, determining semantic similarities, and the like, may be used without departing from the spirit and scope of the illustrative embodiments.

Based on the clustering operation performed by the clustering algorithm, the input question 510 is associated with either an already established cluster or a new cluster is generated for the input question 510. The assignment of a question, and its associated extracted features/attributes, to a cluster may be performed with regard to a determined measure of closeness or similarity of the question, its associated features/attributes, etc., with questions and features/attributes already part of the established clusters. That is, if the question's features/attributes are close enough to one or more clusters, the question and its features/attributes are then associated with the one or more clusters. The determination of whether the question's features/attributes are "close enough" may be measured according to one or more thresholds defining what is "close enough." Thus, for example, if the determined distance between a measure of the question, as may be determined from measures associated with the question's extracted features/attributes, and a center of a cluster is less than a predetermined threshold, then it may be determined that the question and its features/attributes should be associated with that cluster. A question and its features/attributes may be associated with more than one cluster if the question meets the threshold requirements for more than one cluster.

The above clustering may be performed with regard to a plurality of questions in the training question set 592 such that a plurality of clusters may be generated with each cluster comprising one or more questions and their associated features/attributes. Thus, a set of training clusters are generated, and may be stored in the clusters data structure 596, where the training clusters indicate the types of questions that the QA system has been trained to recognize and answer to a satisfactory degree. That is, these questions were used to train the QA system by adjusting its operation to provide satisfactory answering capability for these types of questions and thus, is likely to generate answers to similar questions during runtime with a high measure of confidence. The clusters are defined in accordance with common features/attributes for the various questions associated with the cluster, e.g., common category, classification, attribute scores, etc. The particular questions and their corresponding features/attributes may be stored in the training question set 592 and may have an associated identifier or link to the cluster(s) in the clusters data structure 596 with which the questions are associated.

Once training of the QA system has been performed, the same question pool 502, which may comprise a larger set of questions than those included in training question set 592 such that the training question set 592 is a subset of the question pool 502, may be used to generate a testing question set 594 to test the operation of the QA system. Depending on the desired goal of the testing, the testing questions set 594 may be comprised of testing questions selected from the question pool 502 that satisfy the testing goal with regard to similarity of the candidate testing question to the questions in the training question set 592. The clustering 590 may be used to identify the similarity of candidate testing questions with training questions in the training question set 592 by performing similar clustering 590 with regard to the training clusters stored in the clusters data structure 596 and the features/attributes of the candidate testing questions.

That is, a candidate testing question is selected from the question pool 502 either through an automated mechanism, a semi-automated mechanism, or a manual process and submitted to the QA system pipeline 500 in a manner similar to that described above with regard to the training questions. Using an automated mechanism, questions may be selected from the question pool 502 in an arbitrary manner, randomly, pseudo-randomly, based on predefined criteria (e.g., creation dates, numbers of times the question has been selected for inclusion in a training and/or testing set, or any other suitable criteria), or the like. Similarly, in a semi-automated process, the automated mechanism may perform an initial selection of questions from the question pool 502 and a user may review the initial selection and modify it as desired, such as via a graphical user interface of a computing device, for example, to generate a revised set of selection candidate testing questions. In a manual process, the selection of candidate testing questions may be left entirely up to a user that selects the questions based on their own subjective decision making from the question pool 502 via a graphical user interface of a computing device. A similar selection of questions from the question pool 502 may be performed during the training described above with regard to questions selected from the question pool 502 as candidate training questions for inclusion in the training set 592.

Regardless of the manner by which the candidate testing question is selected from the question pool 502, the candidate testing question is again subjected to the question and topic analysis 520 of the pipeline 500 to generate extracted features/attributes for the candidate testing question. This information is provided to the question clustering process 590 which performs clustering of the candidate test question based on these extracted features/attributes with regard to the predefined training clusters in the clusters data structure 596. Thus, based on the extracted features/attributes, the candidate testing question may be plotted in relation to the training clusters and the Euclidean distance between the candidate testing question and the cluster centers of the various training clusters may be identified.

For those distances that meet a predetermined criteria, e.g., the distance is equal to or less than a predefined threshold distance, the candidate testing question may be associated with the corresponding training cluster. That is, the question clustering process 590 determines that the candidate testing question is significantly similar to the training questions associated with those training clusters and would generally be added to those clusters. For example, if, through the feature/attribute extraction process it is determined that the candidate testing question is directed to a significantly same or similar domain, category of answer, or the like, as that of a training cluster, then the candidate testing question may be associated with that particular training cluster, and such may be communicated back to a user or otherwise automatically used to determine whether to maintain or eliminate the candidate testing question from consideration for inclusion in the testing question set 594.

In other words, based on the identification of training clusters with which the candidate testing question is associated, the question clustering process 590 may determine whether to keep or discard the candidate testing question from the final testing question set 594. Whether or not to keep the candidate testing question in the final testing question set 594 or to eliminate the candidate testing question from the testing question set 594 may be based on the specified purpose for the final testing question set 594. For example, if the final testing question set 594 is intended to be comprised of testing questions that are significantly different from the training questions in the training question set 592, then candidate testing questions that are associated with training clusters, because their distances meet the determined threshold for closeness to a training cluster, may be eliminated from the testing question set 594. This may be useful to test the ability of the QA system to be extended to questions outside the areas for which the QA system is specifically trained.

Alternatively, if the final testing question set 594 is intended to be comprised of testing questions that are significantly similar to the training questions in the training question set 592, for example to test the training of the QA system with regard to similar questions, then the testing question may be maintained in the testing question set 594 if it is significantly close enough to one or more of the training clusters (as measured by a comparison of the distance to one or more predetermined threshold distance values). Candidate testing questions that are not significantly close enough may be eliminated from the testing question set 594.

In yet another embodiment, candidate testing questions may be maintained in the testing question set 594 if they are sufficiently close in distance to one or more training clusters, but not too close in distance to the one or more training clusters. In other words, a first threshold may be defined that indicates a minimum distance away from training cluster centers that is required for a candidate testing question to be included in the testing question set 594. Candidate testing questions that have a distance that is equal to or less than this first threshold to one or more of the training clusters may be eliminated from the testing question set 594.

A second threshold may be defined that indicates a maximum distance away from the training cluster centers beyond which the candidate testing question is determined to be too dissimilar from the training questions to be likely to be answered correctly by the trained QA system, or, for other reasons, should not be maintained in the testing question set 594. Thus, if a candidate testing question has a distance that is greater than this threshold, then the candidate testing question may be eliminated from the testing question set 594. In this embodiment, only candidate testing questions whose distances to training clusters lie between the first threshold and the second threshold are maintained in the testing question set 594.

It should be appreciated that different thresholds may be associated with different training clusters based on the desired operation of the training/testing. Thus, for example, if a user wants to increase/decrease the number of questions of a particular type, category, or having features/attributes of a particular type, in either the training or testing question sets 592 or 594, the user may modify the thresholds so as to increase/decrease the likelihood that candidate questions from the question pool 502 directed to the particular question type, category, or having features/attributes of a particular type, etc., are selected for inclusion in the training/testing question sets 592, 594.

Figure 6:
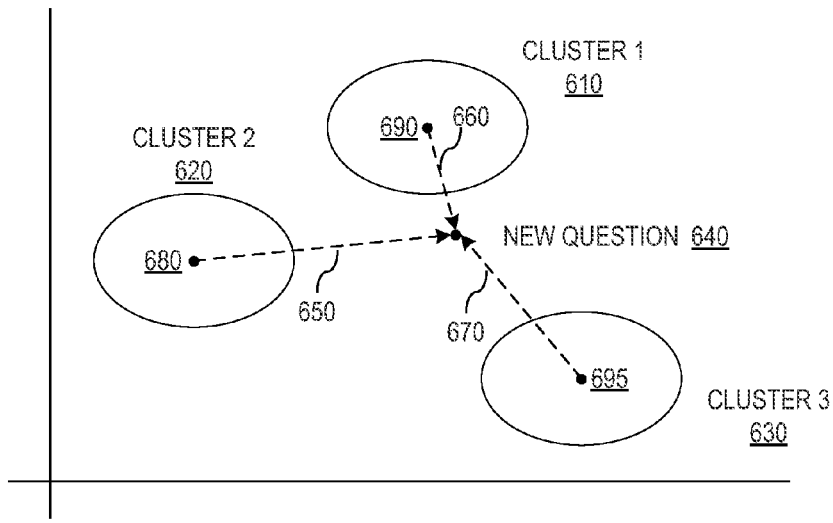
FIG. 6 illustrates a plot of clusters and a candidate question in accordance with one illustrative embodiment.

Thus, with the mechanisms of the illustrative embodiments, clustering of questions may be used to generate training and testing question sets in accordance with the desired training/testing goals for the QA system. This is further illustrated in FIG. 6 which shows a plot of clusters and a candidate question in accordance with one illustrative embodiment. The plot shown in FIG. 6 is with regard to an N-dimensional space along features/attributes of the input questions. For illustration purposes, a two-dimensional plot is depicted, however it should be appreciated that the plot may be along multiple dimensions in excess of 2.

As shown in FIG. 6, three training clusters 610-630 have been defined through the clustering process based on the features/attributes of already processed training questions. The training clusters 610-630 represent a grouping of questions having similar features/attributes that all fall within X % of the cluster center 680-695 of the cluster 610-630.

A new candidate question 640 is then processed and plotted based on its extracted features/attributes. The Euclidean distances 650-670 from the plotted position of the new candidate question 640 to the cluster centers 680-695 for each of the clusters 610-630 is then determined and compared to one or more thresholds associated with the various clusters 610-630. If the distance meets the requirements of the one or more thresholds associated with the cluster 610-630, then the new candidate question 640 is determined to be similar to the questions associated with that cluster 610-630 and is also associated with that cluster 610-630. This may cause the definition of the cluster 610-630 to be expanded to include the additional new candidate question 640 and may thus, expand the borders of the cluster 610-630. In the depicted example, it is assumed that the new candidate question 640 meets the threshold requirements for cluster 610 only and thus, is associated with cluster 610.

As will be appreciated, the new candidate question 640 may be a training question during the generation of a training question set 592 or a testing question during the generation of the testing question set 594. During training, the new candidate question 640 may be added to the cluster 610-630 with which it is determined to be associated and corresponding information for the question and its association with a cluster may be stored in a cluster data structure 596 and training question set data structure 592, for example. During generation of the testing question set 594, additional logic may be provided for determining whether to keep or discard the new candidate question 640 from the testing question set data structure 594 based on the comparison of the distance to the one or more thresholds of the clusters 610-630.

In the depicted example, during the generation of the training question set 592, the new candidate question 640 would be added to and associated with the cluster 610 such that the new candidate question 640 and its associated features/attributes are added to the definition of the training cluster 610. During the generation of the testing question set 594, the maintaining or elimination of the new candidate question 640 in the testing question set 594 depends on the intended use of the testing question set 594. If questions similar to the training questions are desired to be included in the testing question set 594, then the new candidate question 640 may be maintained in the testing question set 594. If questions that are not too similar to the training questions are desired to be included in the testing question set 594, and questions that are determined to be similar to the training questions are to be eliminated, then the new candidate question 640 may be eliminated from the testing question set 594 based on its determined similarity to the questions in cluster 610. Moreover, as mentioned previously, multiple thresholds may be established to identify questions whose distance falls outside of a first threshold but inside another threshold with regard to the cluster center.

It should be appreciated that while the above description describes an embodiment of the invention in which the clustering process utilizes the extraction of features and attributes from an input question performed by the QA system pipeline 500, the illustrative embodiments are not limited to such. Rather, a separate question and topic analysis engine may be provided in conjunction with the clustering process such that question and topic analysis performed to extract the features/attributes of the input question may be performed separate from the pipeline 500. In this way, the creation of the training and testing question sets 592 and 594 may be performed separate from the execution of the pipeline 500. The resulting training question sets 592 and 594 may be submitted to the QA system pipeline 500 so as to train and test the QA system pipeline 500 after having been generated by the separate feature/attribute extraction, clustering, and generation of the training and testing question sets 592, 594.

Thus, the illustrative embodiments provide mechanisms for assisting in the selection of candidate questions from a question pool to be included in one or more of a training question set and a testing question set. The selection is done with regard to the desired approach to testing the QA system. Thresholds may be defined so as to select testing questions that are similar, dissimilar, or within a range of similarity to training questions used to train the QA system. Moreover, thresholds may be set for individual training clusters so as to increase/decrease the likelihood of similar questions being present in the testing question set. In this way, the testing question set may be fine tuned based on the clusters of similar questions generated during training of the QA system.

Returning to FIG. 5, in another aspect of the illustrative embodiments, during runtime execution of the QA system, e.g., after training and testing have been performed using the training question set 592 and testing question set 594 described above, the clustering process 590 may further be used to perform routing of an input question to an appropriate QA system pipeline 500 that has been trained using training questions similar to the input question. That is, during training of the QA system, clustering is performed to generate clusters of training questions as described above. The questions of a training cluster are used to train a separate instance of the QA system pipeline 500 for the particular training cluster. Thus, a plurality of QA system pipelines 500 are generated, each one being associated with a separate training cluster and being trained using the training questions in the associated training cluster of the cluster data structure 596. Moreover, each QA system pipeline 500 may be tested using testing questions that are sufficiently similar/dissimilar to the training questions in the training cluster associated with the QA system pipeline based on the clustering of testing questions in the manner previously described above. As such, in some illustrative embodiments, separate testing question sets 594, or subsets of a single testing question set 594, may be generated for each of the QA system pipelines 500.

For example, during training of the QA system, clustering is performed on the training questions to generate training clusters associated with different question domains, e.g., topics, areas of interest, question subject matter categories, or the like. These question domains may be of various types including, for example, healthcare, financial, legal, or other types of question domains. These separate training clusters may be individually utilized to train separate instances of the QA system pipeline 500 to thereby generate a plurality of trained QA system pipelines 500, e.g., one for healthcare questions, one for financial questions, one for legal questions, and the like. Because these QA system pipelines are individually trained and specialized for the particular domains that they are associated with, they can be individually tuned through the training process to provide highly reliable question answering for the particular domain for which they are trained, thereby improving the confidence with which the QA system generates answers for input questions of that particular domain. Moreover, since the QA system as a whole may be comprised of a plurality of these specially trained individual QA system pipelines 500, the QA system as a whole is able to handle input questions from a large variety of domains, thereby making the QA system more versatile.

Having trained and testing a plurality of such QA system pipelines 500 using the clustering processes previously described, during runtime the mechanisms of the illustrative embodiments may utilize clustering to determine to which QA system pipeline 500 an input question 510 should be routed. That is, after the training of the QA system pipelines 500, each training cluster in the cluster data structure 596 may be associated with a particular QA system pipeline 500 that the training cluster was used to train. This association may be stored in the cluster data structure 596 and may be used to assist in routing input questions 510, such as may be received from a user via the user's client computing device, to a QA system pipeline 500 that has been trained to answer questions similar to the input question 510.

When an input question 510 is received during runtime, the input question 510 is processed by the question and topic analysis stage 520 to extract the features/attributes of the input question 510 which are then used as a basis for clustering the input question 510 with one or more of the training clusters in the clusters data structure 596. The thresholds previously described above may again be used to determine if the input question is sufficiently similar/dissimilar to the questions of the various training clusters based on the determined distance between the input question and the cluster centers. In one illustrative embodiment, if the input question 510 is sufficiently similar to one or more of the training clusters, then the corresponding QA system pipeline(s) 500 are identified and the input question is submitted those QA system pipeline(s) for processing. The processing results in a ranked list of answers to the input question and/or a final answer with corresponding confidence scores as previously described above. Since the input question 510 may be routed to more than one QA system pipeline 500, these ranked lists of answers and/or final answers for each of the QA system pipelines 500 may be combined and presented to the user as a listing of candidate answers for the input question 510 with corresponding confidence scores. Moreover, through the merging process, the candidate answers from multiple QA system pipelines 500 may be merged and a final answer selected from the merged candidate answers based on confidence scores.

Figure 7:
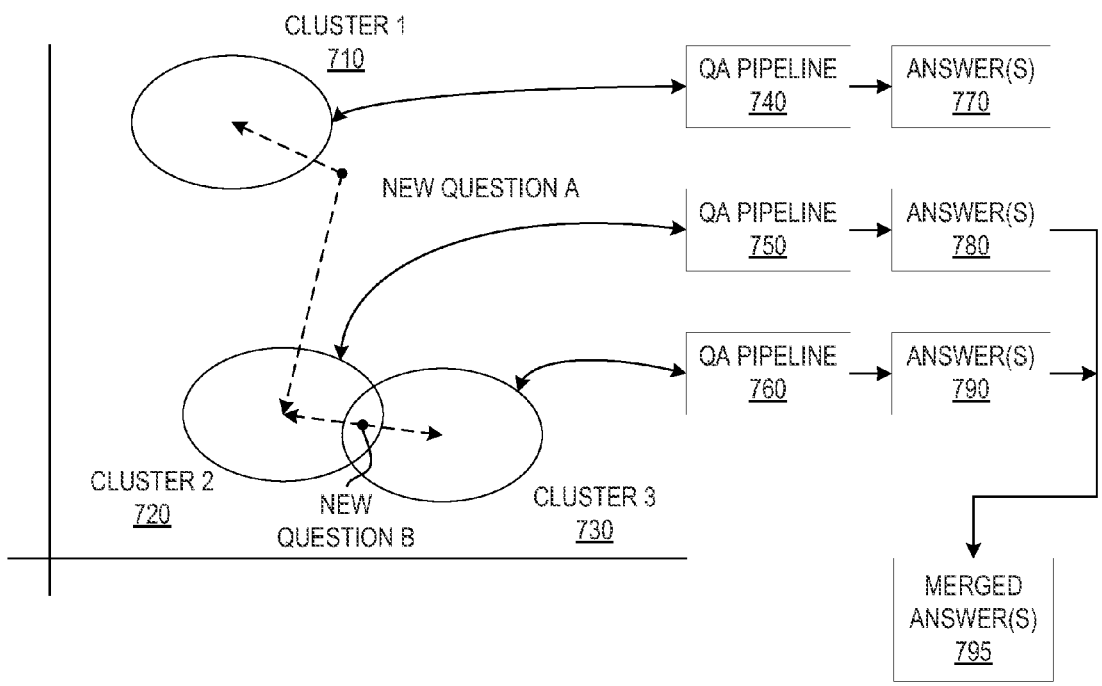
FIG. 7 provides an example plot of training clusters and an input question in accordance with one illustrative embodiment.

To further illustrate the operation of the illustrative embodiments during runtime, FIG. 7 provides an example plot of training clusters and an input question in accordance with one illustrative embodiment. In the depicted example of FIG. 7, a plurality of training clusters 710-730 are generated and a new input question A is received by the QA system. Each of the training clusters 710-730 are associated with a separate QA system pipeline instance 740-760, respectively, and are used to train their associated QA system pipeline instances 740-760. Thus, training cluster 710 is associated with QA system pipeline instance 740, training cluster 720 is associated with QA system pipeline instance 750, and training cluster 730 is associated with QA system pipeline instance 760.

The new input question A is clustered with the training clusters 710-730 by applying the clustering process to the features/attributes of the new input question A, plotting the new input question A relative to the training clusters, determining the distance from the new input question A to the cluster centers, and identifying a training cluster 710-730 having a shortest distance between the input question A and the training cluster's center, and which is within any defined thresholds. In the depicted example, input question A is closest to training cluster 710. As a result, the associated QA system pipeline instance 740 is identified as being associated with training cluster 710 and the input question A is submitted to the QA system pipeline instance 740 for processing and generation of a ranked listing of answers and/or final answer 770. This will achieve an improved performance of the QA system with regard to the input question A since the QA system pipeline instance 740 has been trained to perform question answering for the domain with which input question A is associated.

In another example, as shown in FIG. 7, input question B is received and, through the clustering process is associated with multiple training clusters, e.g., clusters 720-730. In the depicted example, this is because the training clusters 720-730 overlap, i.e. have features/attributes of training questions that are common between the clusters 720-730, and the input question B has features/attributes lying in this range of overlap. However, this is not the only way in which an input question may be associated with multiple training clusters. To the contrary, there may be no overlap between training clusters and the input question may still be associated with more than one training cluster if the distances between the input question these clusters meets the defined threshold requirements for being associated with the clusters.

In a case where the input question is associated with multiple training clusters, the input question is submitted to the QA system pipeline instances associated with each of the training clusters with which the input question is associated. Thus, in the depicted example, the input question B is submitted to each of the QA system pipeline instances 750-760. Each of these QA system pipeline instances 750-760 process the input question B separately to generate their own ranked listing of answers and/or final answer 780-790 and confidence scores. These individual ranked listings/final answers may be merged 795 to generate a single ranked listing of answers and/or a single final answer based on confidence scores associated with the various answers.

In addition, with reference again to FIG. 5, the illustrative embodiments may make use of a user interface/feedback mechanism 598 for presenting the merged ranked listing of answers from multiple QA system pipelines 740-760 to a user and obtaining feedback input from the user specifying which answer the user feels is the most correct answer from the ranked listing. That is, the user may be presented with the ranked listing of answers and their corresponding confidence scores and may select an answer from the ranked listing that the user then indicates to be the most correct answer in their subjective determination. This feedback input is returned to the clustering process which uses this information to add the features/attributes of the input question 510 to the definition of the corresponding training cluster 710-730 whose associated QA system pipeline 740-760 generated the answer selected by the user. In this way, the user's feedback assists in the dynamic training of the QA system pipelines during runtime by improving the definition of the training cluster during runtime thereby increasing the likelihood that subsequent similar questions will be routed to the QA system pipelines 740-760 that both training and user feedback indicate to be the best trained QA system pipelines 740-760 for the particular input question.

Thus, in addition to the training and testing mechanisms described previously, the illustrative embodiments may further provide mechanisms for routing input questions to appropriately trained QA system pipelines based on clustering of the features/attributes of the input questions. This improves the operation of the QA system such that the QA system may be provided with separate specialized QA system pipelines trained for separate domains and questions may be routed to these specialized QA system pipelines based on a determination as to which QA system pipeline is the best suited for answer the input question. The mechanisms of the illustrative embodiments further permit user feedback to be used to dynamically update the training of QA system pipelines and improve the routing of input questions to such QA system pipelines.

Figure 8:
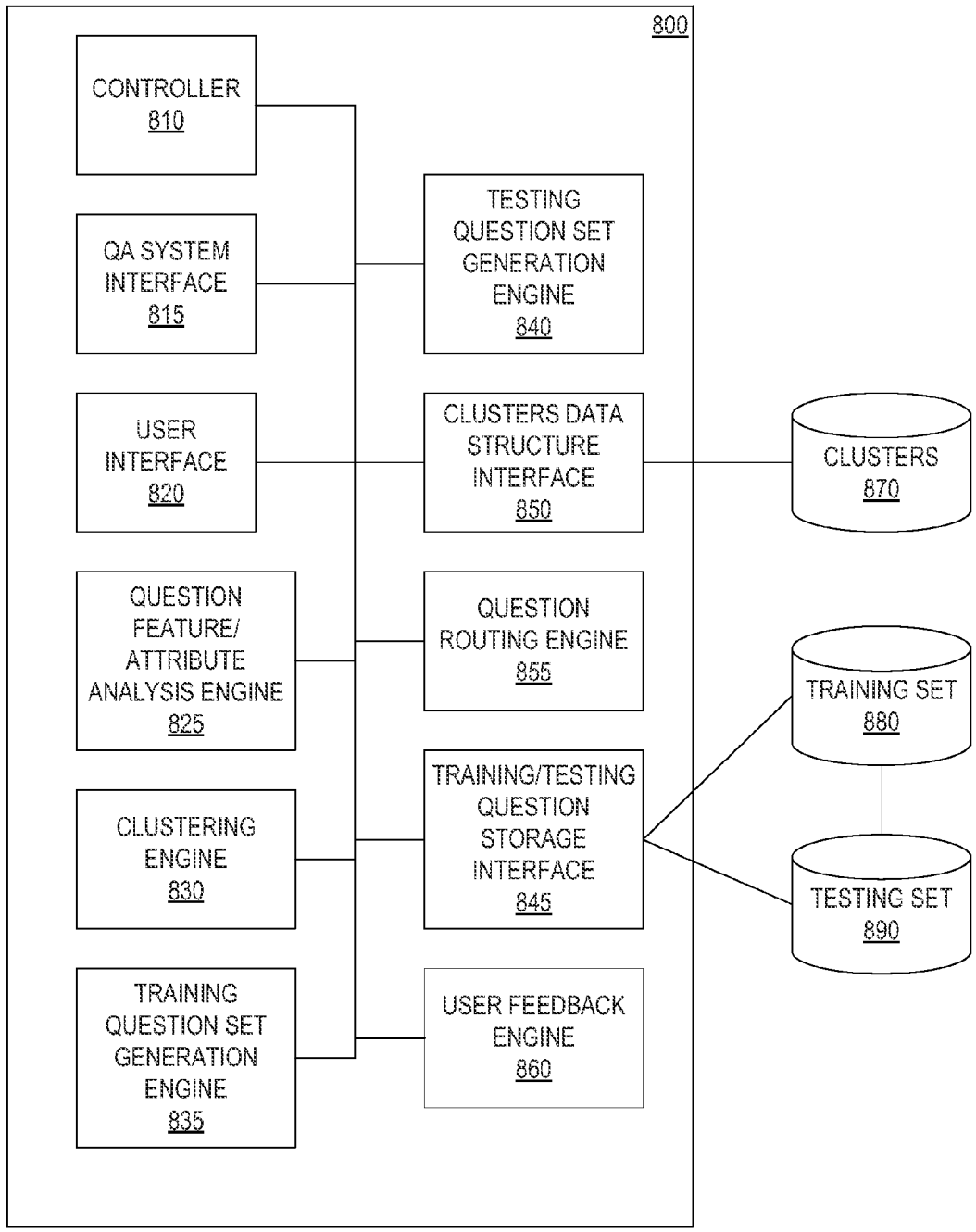
FIG. 8 is an example block diagram of a clustering and routing engine in accordance with one illustrative embodiment.

FIG. 8 is an example block diagram of a clustering and routing engine in accordance with one illustrative embodiment. The elements shown in FIG. 8 may be implemented in software, hardware, or any combination of software and hardware. That is, the elements in FIG. 8 are comprised of logic, either implemented in hardware, software, or a combination of hardware and software, for performing operations to enable the functionality of the clustering and routing engine 800 as described herein. In one illustrative embodiment, the elements in FIG. 8 may be implemented as software instructions loaded into one or more storage devices associated with one or more data processing systems and executed by one or more processing units of these one or more data processing systems. In other illustrative embodiments, one or more of the elements in FIG. 8 may be implemented in one or more hardware elements, such as Application Specific Integrated Circuits (ASICs), firmware, or the like. For purpose of the present description, it will be assumed that the elements of FIG. 8 are implemented as software instructions executed by one or more processing units.

As shown in FIG. 8, the clustering and routing engine 800 includes a controller 810, a QA system interface 815, a user interface 820, a question feature/attribute analysis engine 825, a clustering engine 830, a training question set generation engine 835, a testing question set generation engine 840, a training/testing question set storage interface 845, a clusters data structure interface 850, a question routing engine 855, and a user feedback engine 860. The controller 810 controls the overall operation of the clustering and routing engine 800 and orchestrates the operation of the other elements 815-860.

The QA system interface 815 provides a communication pathway through which control messages, data, and other communications may be passed between the clustering and routing engine 800 and the QA system. In one illustrative embodiment, this interface 815 may be used to communicate and utilize the question and topic analysis logic of the QA system pipeline to receive input questions and their extracted features/attributes for purposes of clustering and performing subsequent clustering dependent actions as previously described above. In other illustrative embodiments, the interface 815 may be used to select specific QA system pipelines, from a plurality of QA system pipelines, based on clustering to thereby route input questions to an appropriate QA system pipeline as previously described above. Still further, the QA system interface 815 may be used to retrieve questions from a question pool associated with the QA system for purposes of building one or more training question sets, one or more testing question sets, or the like. Thus, via the QA system interface 815, question pool information may be retrieved and utilized.

User interface 820 provides logic for presenting user interfaces to users via a data communication connection, e.g., the Internet or other data network, and their client computing devices, and for receiving user input to such user interfaces. For example, the user interface 820 may be used to provide an output of the questions in a question pool for use in user selection of questions to be considered for a training question set and/or testing question set, an output representing the training question clusters generated through clustering, an output representing the testing question set generated through clustering, an output of a ranked listing of candidate answers to an input question during runtime, etc. The user interface 820 may further provide logic for receiving a user input to an output presented to the user for selecting a candidate answer the user subjectively feels to be the most correct for an input question to thereby provide feedback to the clustering and routing engine 800.

The question feature/attribute analysis engine 825 may receive input questions and perform analysis on these questions to extract features/attributes of the input question for use in clustering. The extraction of features/attributes may be done in a similar manner as described previously with regard to the question and topic analysis phase of the QA system pipeline. Alternatively, the question analysis may be performed by the question and topic analysis logic of the QA system pipeline with which the clustering and routing engine 800 may communicate using the QA system interface 815, in which case the question feature/attribute analysis engine 825 may be eliminated.

The clustering engine 830 provides the logic for performing clustering of questions based on their extracted features/attributes. The clustering may be performed during generation of the training question set so as to generate training clusters. The clustering may also be done during testing question set generation to identify candidate testing questions that are to be maintained or discarded from the testing question set. The clustering can also be done during runtime operation of the QA system so as route an input question to an appropriate QA system pipeline that has been trained to answer similar questions. The clustering engine 830 may make use of any of a variety of different clustering algorithms to perform the clustering but performs the clustering based on the extracted features/attributes of the particular questions.

The training question set generation engine 835 works in conjunction with the clustering engine 830 to generate training clusters for questions selected to be included in a training question set. The resulting training clusters are stored in the clusters data structure 870 via the clusters data structure interface 850 and are associated with the questions and their features/attributes in the training question set stored in the training question set storage 880, which is accessible via the training/testing question set storage interface 845. The training question set generation engine 835 manages and coordinates the correlation between training questions in the training question set and the resulting training clusters. The training question set generation engine 835 may generate separate training question sets for each of the training clusters and may manage the training of separate QA system pipelines for each of the training clusters based on the corresponding training questions in the training question set associated with the training cluster.

The testing question set generation engine 840 works in conjunction with the clustering engine 830 to select/de-select testing questions for inclusion in one or more testing question sets based on clustering of candidate testing questions to previously defined training clusters in the cluster data structure 870. That is, the features/attributes of a candidate testing question may be clustered with the training clusters to identify which clusters the candidate testing question is closest to and for which established thresholds are met, and may then determine whether to include or eliminate the candidate testing question from the testing question set data structure 890 based on such clustering. Whether or not to keep or discard a candidate testing question depends on the manner by which the testing question set generation engine 840 is configured. Such configuration information, as well as thresholds and other configuration information, may be maintained by the controller 810 and used to coordinate and orchestrate the operation of the elements of the clustering and routing engine 800.

The training/testing question set storage interface 845 provides a communication interface through which the training/testing question set data structures 880-890 are made accessible. The clusters data structure interface 850 provides a communication interface through which the cluster data structure 870 is made accessible.

The question routing engine 855 operates during runtime to route an input question to a corresponding QA system pipeline that has been configured to perform question answering for a domain to which the input question is determined to be directed. That is, the question routine engine 855 may work in conjunction with the clustering engine 830 to cluster the input question to a particular training cluster and then identify a QA system pipeline associated with the training clusters with which the input question is determined to be associated. The input question may then be submitted to these QA system pipeline(s) and resulting ranked listings of candidate answers may be returned and merged to generate a merged ranked listing of candidate answers and/or a final answer to the input question.

The user feedback engine 860 may present a user interface to a user during runtime operation of the QA system so as to present a ranked listing of candidate answers to the user, or a merged ranked listing of candidate answers if more than one QA system pipeline was used to process an input question. The user feedback engine 860 may then receive input from the user specifying which candidate answer the user subjectively determines to be the most correct answer for the input question. The user input may then be communicated by the user feedback engine 860 to the clustering engine 830 so as to add the features/attributes and question to the definition of the training cluster associated with the QA system pipeline that generated the user selected candidate answer. In this way, the user feedback engine 860 dynamically updates the training clusters based on user feedback.

Figure 9:
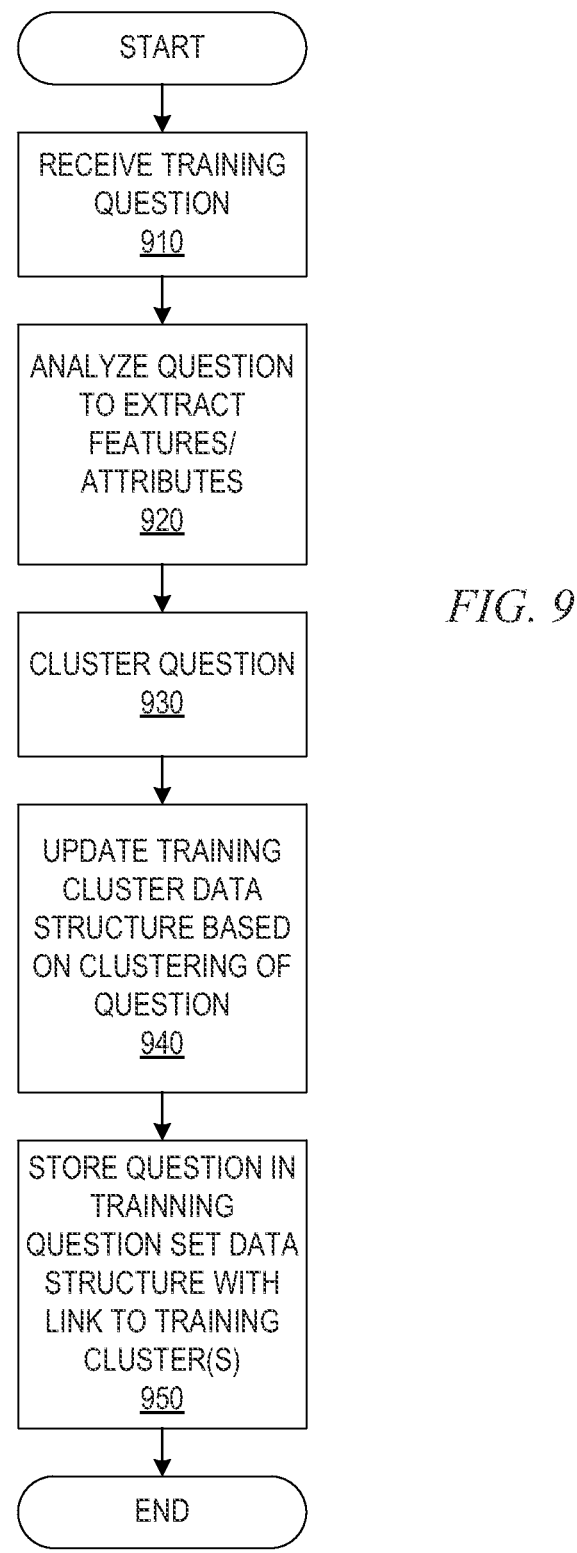
FIG. 9 is a flowchart outlining an example operation for generating training question clusters in accordance with one illustrative embodiment.

FIG. 9 is a flowchart outlining an example operation for generating training question clusters in accordance with one illustrative embodiment. As shown in FIG. 9, the operation starts by receiving a training question (step 910). The training question is analyzed to extract its features/attributes (step 920). The training question is then clustered with other similar training questions previously processed based on an evaluation of the features/attributes (step 930). The resulting training cluster data structure is updated and/or stored in a cluster data structure for later use (step 940). The training question is stored in a training question set data structure with a link to the training cluster(s) with which the training question is associated (step 950). This cluster data structure may alternatively, or in addition, store a link or identifier of an association of the training cluster with the training question and its features/attributes. The operation then terminates. This process may be repeated for each training question that is received such that a plurality of training clusters may be generated with each training cluster comprising one or more associated training questions and their features/attributes.

Figure 10:
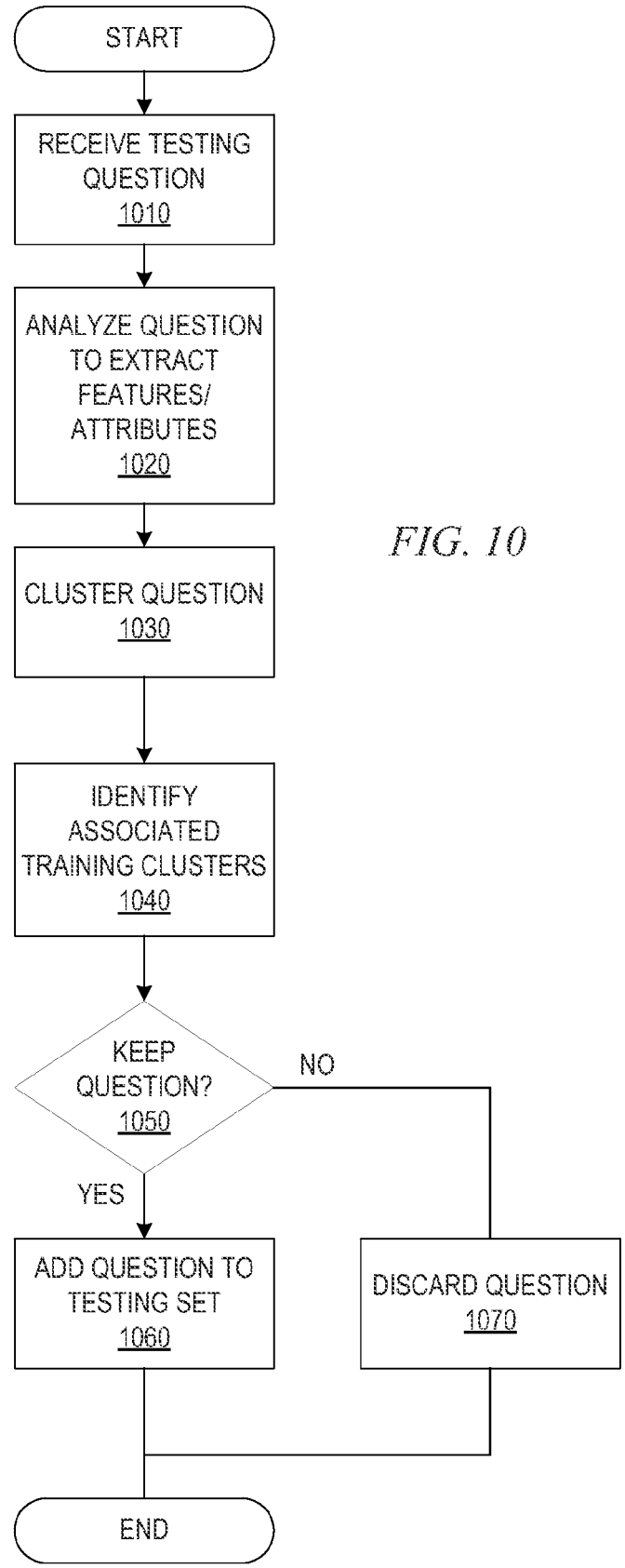
FIG. 10 is a flowchart outlining an example operation for generating a testing question set in accordance with one illustrative embodiment.

FIG. 10 is a flowchart outlining an example operation for generating a testing question set in accordance with one illustrative embodiment. As shown in FIG. 10, the operation starts by receiving a candidate testing question (step 1010). The candidate testing question is analyzed to extract is features/attributes (step 1020). The candidate testing question is then clustered with pre-defined training clusters based on the extracted features/attributes (step 1030). Based on the clustering, it is determined which training clusters the candidate testing question is close to and for which clusters the associated threshold distances are satisfied (step 1040). Based on these determinations, a subsequent determination is made as to whether to keep or discard the candidate testing question from the testing question set (step 1050). This may be done based on a configuration of the system as to whether testing questions similar to the training questions, dissimilar to the training questions, or sufficiently similar but having some measure of dissimilarity are to be retrained in the testing question set. If the testing question is to be kept, then it and its features/attributes are added to the testing question set (step 1060). If the testing question is not to be kept, it and its features/attributes are discarded and not included in the testing question set (step 1070). The operation then terminates. This operation may be repeated for each candidate testing question processed by the QA system.

Figure 11:
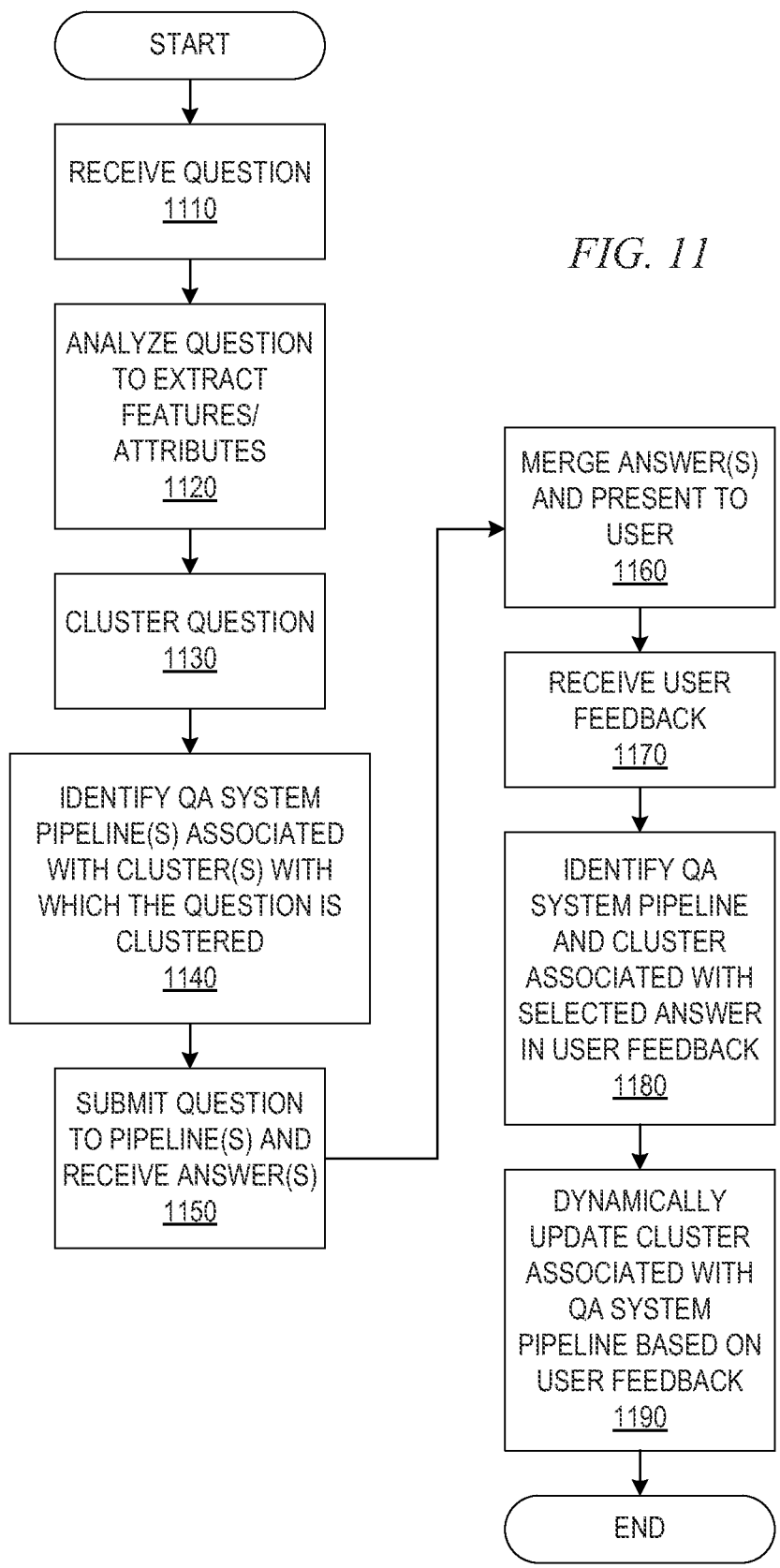
FIG. 11 is a flowchart outlining an example operation for processing an input question during runtime operation of a QA system in accordance with one illustrative embodiment.

FIG. 11 is a flowchart outlining an example operation for processing an input question during runtime operation of a QA system in accordance with one illustrative embodiment. As shown in FIG. 11, the operation starts by receiving an input question from a user (step 1110). The input question is processed to extract features/attributes from the input question (step 1120). The input question is then clustered with one or more of the pre-defined training clusters to identify associations of the input question to one or more training clusters (step 1130). The QA system pipeline(s) associated with the training clusters with which the input question is associated are identified (step 1140). The input question is then submitted to the identified QA system pipeline(s) and candidate answers are received back from the QA system pipeline(s) (step 1150). The candidate answers are merged, if necessary, and presented as output to the user via the user's client computing device (step 1160). User feedback input is received from the user indicating which candidate answer the user subjectively feels to be the most correct answer from the candidate answers (step 1170). The QA system pipeline and associated training cluster that generated the user selected answer is identified (step 1180). The question and its extracted features/attributes are added to the definition of the training cluster to thereby dynamically update the definition of the training cluster (step 1190). The operation then terminates. This process may be repeated for each of the input questions received for processing during runtime operation of the QA system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for selecting a pipeline of a question and answer (QA) system to process an input question, the method comprising:

receiving, in the data processing system, an input question;

analyzing, by the data processing system, the input question to identify at least one feature of the input question;

performing, by the data processing system, clustering of the input question with one or more previously generated clusters of questions based on the at least one feature of the input question, wherein each cluster in the one or more previously generated clusters is associated with a different QA system pipeline, and wherein each QA system pipeline is trained for answering questions of a different domain;

identifying, by the data processing system, a matching cluster, of the one or more previously generated clusters, with which the input question is associated based on a distance of the input question from a center of the identified matching cluster;

identifying, by the data processing system, a QA system pipeline associated with the matching cluster; and processing, by the data processing system, the input question using the identified QA system pipeline to generate one or more candidate answers for the input question.

2. The method of claim 1, wherein identifying a matching cluster comprises:

determining, for each previously generated cluster in the one or more previously generated clusters, a distance of the input question from a center of the previously generated cluster; and selecting a matching cluster, from the one or more previously generated clusters, based on the determined distances.

3. The method of claim 2, wherein selecting a matching cluster comprises:

comparing the distances to one or more threshold distance values; and selecting a matching cluster based on whether or not a corresponding distance of the matching cluster has a predetermined relationship with the one or more threshold distance values.

4. The method of claim 1, wherein identifying a matching cluster, of the one or more previously generated clusters, with which the input question is associated comprises identifying a plurality of matching clusters with which the input question is associated, and wherein identifying a QA system pipeline associated with the matching cluster comprises identifying a plurality of QA system pipelines associated with the plurality of matching clusters.

5. The method of claim 4, wherein processing, by the data processing system, the input question using the identified QA system pipeline to generate one or more candidate answers for the input question comprises generating, by each of the QA system pipelines associated with matching clusters in the plurality of clusters, a separate ranked listing of candidate answers.

6. The method of claim 5, wherein processing, by the data processing system, the input question using the identified QA system pipeline to generate one or more candidate answers for the input question comprises:
merging the separate ranked listings of candidate answers into a single ranked listing of candidate answers; and
presenting the single ranked listing of candidate answers to a user via a user interface.

7. The method of claim 6, further comprising:
receiving user feedback via the user interface, the user feedback selecting an answer from the ranked listing that the user indicates to be a most correct answer; and
adding the at least one feature of the input question to a definition of a matching cluster whose corresponding QA system pipeline generated the selected answer.

8. The method of claim 1, wherein each cluster is a cluster of training questions used to train a QA system pipeline associated with the cluster.

9. The method of claim 8, wherein each cluster is generated through a clustering process applied to questions selected from a pool of questions comprising both training questions and testing questions to thereby generate the one or more previously generated clusters, and wherein the one or more previously generated clusters comprise training questions selected from the pool of questions.

10. A computer program product comprising a non-transitory computer readable medium having a computer readable program stored therein, wherein the computer readable program, when executed on a computing device, causes the computing device to:
receive an input question;
analyze the input question to identify at least one feature of the input question;
perform clustering of the input question with one or more previously generated clusters of questions based on the at least one feature of the input question, wherein each cluster in the one or more previously generated clusters is associated with a different QA system pipeline, and wherein each QA system pipeline is trained for answering questions of a different domain;
identify a matching cluster, of the one or more previously generated clusters, with which the input question is associated based on a distance of the input question from a center of the identified matching cluster;
identify a Question and Answer (QA) system pipeline associated with the matching cluster; and
process the input question using the identified QA system pipeline to generate one or more candidate answers for the input question.

11. The computer program product of claim 10, wherein the computer readable program further causes the computing device to identify a matching cluster at least by:
determining, for each previously generated cluster in the one or more previously generated clusters, a distance of the input question from a center of the previously generated cluster; and
selecting a matching cluster, from the one or more previously generated clusters, based on the determined distances.

12. The computer program product of claim 11, wherein the computer readable program further causes the computing device to select a matching cluster at least by:
comparing the distances to one or more threshold distance values; and
selecting a matching cluster based on whether or not a corresponding distance of the matching cluster has a predetermined relationship with the one or more threshold distance values.

13. The computer program product of claim 10, wherein the computer readable program further causes the computing device to identify a matching cluster, of the one or more previously generated clusters, with which the input question is associated at least by identifying a plurality of matching clusters with which the input question is associated, and wherein the computer readable program further causes the computing device to identify a QA system pipeline associated with the matching cluster at least by identifying a plurality of QA system pipelines associated with the plurality of matching clusters.

14. The computer program product of claim 13, wherein the computer readable program further causes the computing device to process the input question using the identified QA system pipeline to generate one or more candidate answers for the input question at least by generating, by each of the QA system pipelines associated with matching clusters in the plurality of clusters, a separate ranked listing of candidate answers.

15. The computer program product of claim 14, wherein the computer readable program further causes the computing device to process the input question using the identified QA system pipeline to generate one or more candidate answers for the input question at least by:
merging the separate ranked listings of candidate answers into a single ranked listing of candidate answers; and
presenting the single ranked listing of candidate answers to a user via a user interface.

16. The computer program product of claim 15, wherein the computer readable program further causes the computing device to:
receive user feedback via the user interface, the user feedback selecting an answer from the ranked listing that the user indicates to be a most correct answer; and
add the at least one feature of the input question to a definition of a matching cluster whose corresponding QA system pipeline generated the selected answer.

17. The computer program product of claim 10, wherein each cluster is a cluster of training questions used to train a QA system pipeline associated with the cluster.

18. An apparatus comprising:
a processor; and
a memory coupled to the processor, wherein the memory comprises instructions which, when executed by the processor, cause the processor to:
receive an input question;
analyze the input question to identify at least one feature of the input question;

perform clustering of the input question with one or more previously generated clusters of questions based on the at least one feature of the input question, wherein each cluster in the one or more previously generated clusters is associated with a different QA system pipeline, and wherein each QA system pipeline is trained for answering questions of a different domain;

identify a matching cluster, of the one or more previously generated clusters, with which the input question is associated based on a distance of the input question from a center of the identified matching cluster;

identify a Question and Answer (QA) system pipeline associated with the matching cluster; and process the input question using the identified QA system pipeline to generate one or more candidate answers for the input question.

19. The apparatus of claim 18, wherein identifying a matching cluster comprises:

determining, for each previously generated cluster in the one or more previously generated clusters, a distance of the input question from a center of the previously generated cluster; and comparing the distances to one or more threshold distance values; and selecting a matching cluster based on whether or not a corresponding distance of the matching cluster has a predetermined relationship with the one or more threshold distance values.

20. The apparatus of claim 18, wherein identifying a matching cluster, of the one or more previously generated clusters, with which the input question is associated comprises identifying a plurality of matching clusters with which the input question is associated, and wherein identifying a QA system pipeline associated with the matching cluster comprises identifying a plurality of QA system pipelines associated with the plurality of matching clusters.

* * * * *